(12) United States Patent
Tammattabattula

(10) Patent No.: US 10,248,927 B2
(45) Date of Patent: Apr. 2, 2019

(54) MULTIFUNCTIONAL SELF-SERVICE SHIPPING AND MAIL PROCESSING SYSTEM

(71) Applicant: Rakesh Holdings, LLC, San Juan Capistrano, CA (US)

(72) Inventor: Rakesh Tammattabattula, Ontario, CA (US)

(*) Notice: Subject to any disclaimer, the term of this patent is extended or adjusted under 35 U.S.C. 154(b) by 595 days.

(21) Appl. No.: 14/920,736

(22) Filed: Oct. 22, 2015

(65) Prior Publication Data
US 2017/0116571 A1    Apr. 27, 2017

(51) Int. Cl.
*G06Q 10/08* (2012.01)
*G07B 17/00* (2006.01)
*A47G 29/14* (2006.01)

(52) U.S. Cl.
CPC ....... *G06Q 10/0836* (2013.01); *A47G 29/141* (2013.01); *G06Q 10/0835* (2013.01); *G07B 17/00661* (2013.01); *A47G 2029/145* (2013.01); *A47G 2029/146* (2013.01); *A47G 2029/149* (2013.01); *G07B 2017/00209* (2013.01); *G07B 2017/00685* (2013.01)

(58) Field of Classification Search
CPC .......... G06Q 10/0835; G06Q 10/0836; A47G 29/141; A47G 29/16; A47G 2029/146; G07B 17/00661; G07B 2017/00209; G07B 2017/00685
USPC ........................................................ 705/336
See application file for complete search history.

(56) References Cited

U.S. PATENT DOCUMENTS

| | | |
|---|---|---|
| 5,369,258 A | 11/1994 | Sansone et al. |
| 6,690,997 B2 | 2/2004 | Rivalto |
| 7,844,481 B2 | 11/2010 | Hilbush et al. |
| 2003/0072469 A1 | 4/2003 | Alden |
| 2004/0203377 A1 | 10/2004 | Eaton et al. |
| 2005/0108111 A1 | 5/2005 | Kranyec |
| 2005/0116821 A1 | 6/2005 | Wilsey et al. |
| 2006/0122858 A1 | 6/2006 | Miles et al. |
| 2006/0212411 A1* | 9/2006 | Gabay, Jr. ............. G06Q 30/02 705/500 |
| 2007/0226088 A1 | 9/2007 | Miles et al. |

(Continued)

OTHER PUBLICATIONS

Lai-Lai Tung, "Information Kiosk for Use in Electronic Commerce: Factors Affecting its Ease of Use and Usefulness"; 14th Bled Electronic Commerce Conference; Jun. 25-26, 2001 (Year: 2001).*

*Primary Examiner* — Kevin H Flynn
*Assistant Examiner* — Emmett K. Walsh
(74) *Attorney, Agent, or Firm* — David Duckworth

(57) ABSTRACT

A package shipping processing system has a kiosk housing, with a computer terminal with a display device, an input device, a data processor, and network data communications module included therein. A weighing scale with a platform on which objects for shipment are placed, and in communication with the computer terminal, reports a measured weight of the object. An imaging device is disposed in proximity to the weighing scale and positioned to have a field of view extending beyond the platform of the weighing scale. The imaging device is in communication with the computer terminal to transmit captured image data of the object placed on the platform. The data processor generates dimensional parameters along a plurality of axes based on the image data, and a new shipping record with the dimensional parameters and the measured weight of the object.

6 Claims, 15 Drawing Sheets

(56) References Cited

U.S. PATENT DOCUMENTS

| | | | |
|---|---|---|---|
| 2007/0284974 A1* | 12/2007 | Buhrman | A47B 47/042 312/108 |
| 2008/0133372 A1* | 6/2008 | Ramsden | G01G 19/005 705/17 |
| 2009/0222354 A1* | 9/2009 | Murphy | G06Q 10/087 705/21 |
| 2009/0265248 A1 | 10/2009 | Walker | |
| 2009/0271316 A1 | 10/2009 | Kranyec | |
| 2009/0313948 A1* | 12/2009 | Buckley | G06Q 10/083 53/456 |
| 2010/0153291 A1 | 6/2010 | Jimenez et al. | |
| 2011/0161231 A1 | 6/2011 | Sievel et al. | |
| 2012/0123970 A1 | 5/2012 | Loretto et al. | |
| 2012/0176649 A1 | 7/2012 | Giordano et al. | |
| 2014/0104414 A1* | 4/2014 | McCloskey | G06Q 10/083 348/135 |
| 2014/0258168 A1* | 9/2014 | Crawford | G06Q 10/0836 705/339 |
| 2014/0279648 A1 | 9/2014 | Whitehouse | |
| 2015/0066795 A1 | 3/2015 | Gillen et al. | |
| 2015/0081580 A1 | 3/2015 | Fry | |
| 2015/0186840 A1* | 7/2015 | Torres | A47B 81/00 705/339 |
| 2015/0348282 A1* | 12/2015 | Gibbon | G06Q 10/06315 382/103 |
| 2016/0239789 A1* | 8/2016 | Hanks | G06Q 10/083 |

* cited by examiner

MULTIFUNCTIONAL SELF-SERVICE SHIPPING AND MAIL PROCESSING SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to electronic kiosks, and more particularly, to multifunctional self-service shipping and mail processing systems.

2. Related Art

The movement of goods from an origin to a destination is a foundational economic practice for which much development efforts in systems and methods for managing and improving the efficiency of the process have been focused. In a traditional "brick and mortar" retail environment, the customer simply visits the store and purchases the product, effectively taking physical delivery of the same. The precursor steps of the retailer receiving the product from the distributor, of the distributor receiving the product made and packaged by the manufacturer, and of the manufacturer sourcing raw materials and/or parts for the product remain opaque to the end purchaser. There is typically no involvement of the end purchaser in the logistics of bringing the product to the end retailer, and are instead handled by professional logistics personnel employed by the retailers, distributors, and manufacturers, along with any third party transport service providers retained thereby.

However, due to the ever-increasing popularity of Internet-based shopping, end customers are becoming integrated into the logistics process, that is, purchased products are being delivered to the homes and offices of the customers. Typically, online retailers use third party package delivery services such as UPS, FedEx, DHL, as well as the United States Postal Service that transport purchased products from the distribution centers of the retailers to the customers. Due in part to the high number of package originations, the distribution centers utilize sophisticated logistics systems that integrate tightly with those of the package delivery services. Thus, steps beyond the manual picking/packaging stage such as labeling, sorting, routing, and tracking are highly automated. Unless there is a delivery exception that requires the customer/recipient's intervention, the most that is required by the customer is providing a delivery address to the retailer. This is the case for other types of retail shopping such as catalog and mail ordering.

There may be instances where the customer desires to exchange, return, or otherwise ship a received product back to a retailer or manufacturer, so in such circumstances, the customer may need to interface with the package delivery services. There may be little the customer needs to do besides placing the product to be returned in the box in which it was originally delivered, affixing a pre-printed label that includes the return address of the retailer's return processing center, and physically placing the package in a deposit box or storefront of the shipping company, or arranging for its pickup.

Online shopping, however, is not limited to such high-volume retailers with automated logistics for delivering goods to and accepting returns from the customer. Smaller scale retailers may rely upon existing systems offered by the package delivery services in order to select the appropriate shipping container, determine price, and generate shipping labels that incorporate unique identifiers for routing and tracking the package through the delivery network. Although some of these functions such as rate calculation and label printing can be accomplished with online tools and basic computer equipment, it may be necessary for retailer personnel to visit the package shipping company storefront or customer service center to complete shipment. Shipping companies offer pickup services that may eliminate some of these burdens, but it may be incumbent on the retailer to correctly package and label the packages before pickup.

In order to automate some of these shipping procedures, as well as to provide after business hours service, shipping companies have also installed electronic kiosks in central locations proximal to office buildings and retail establishments. Typically, the kiosks incorporate computer terminals by which addressing information may be entered, a delivery service level (ground, two-day, overnight, etc.) as well as add-on services such as return receipt, insurance, and so forth may be specified. Because shipping costs are generally dependent on the weight of the package, the kiosk may incorporate a scale that measures package weight in order to determine appropriate shipping costs. Shipping rates also depend on the size/dimensions of the package, so the computer terminal may prompt the customer to enter in dimensional data after measuring. The computer terminal may be connected to a label printer that outputs a label for the customer to affix to the package prior to tendering to the shipping company. Additionally, the computer terminal may communicate with a central database of the shipping company to record the newly initiated shipment and all the inputted details thereof. The kiosk may include an integrated deposit box for securely storing the labeled packages for subsequent pickup by shipping company personnel.

Package shipping services are not limited to commercial applications, as gifts and other personal items may be shipped from one individual to another. While the shipping procedures of the shipping companies may be well understood by any retailer that ships packages on a regular basis, they may be seem complex and confusing to individuals who may ship only a packages a year. This is particularly so for those customers using electronic kiosks because guidance may be limited.

Regardless of the relative sophistication of the customer utilizing electronic shipping kiosks, there is a need in the art for self-service shipping systems that automate the shipping procedure, particularly in relation to package acceptance.

BRIEF SUMMARY

The present disclosure is directed to a multifunctional, self-service shipping and mail processing system or kiosk which may be deployed to various retail establishments such as convenience stores, gas stations, shopping malls, and the like. The system is contemplated to provide a convenient location for both the shipper and the package delivery services to process and pick up shipments. The kiosk may include a modular locker unit attached thereto for secure mail and package storage. Additionally, the owner of the retail establishment in which the kiosk is located may share in the revenue generated thereby. The disclosed kiosk may incorporate various features that facilitate a package processing/tendering process that requires minimal time and effort by the shipper/customer.

In accordance with one embodiment of the present disclosure, there is a package shipping processing system including a kiosk housing. There may also be a computer terminal with a display device, an input device, a data processor, and network data communications module. The computer terminal may be disposed in the kiosk housing with the display device and the input device being accessible. The system may also have a weighing scale including a platform on which objects for shipment are placed. The weighing scale may be in communication with the computer terminal. A measured weight of the object placed on the platform can be reported to the computer terminal. Furthermore, there may be an imaging device that is disposed in proximity to the weighing scale and positioned to have a field of view extending beyond the platform of the weighing scale. The imaging device may be in communication with the computer terminal. Captured image data of the object placed on the platform can be transmitted to the computer terminal. The data processor may generate dimensional parameters along a plurality of axes based on the image data, as well as a new shipping record with the dimensional parameters and the measured weight of the object.

According to another embodiment of the present disclosure, there is a method for finalizing a package including one or more objects prior to its tendering to a package shipping service. The method may include receiving, on a data processing device, weight data from a scale on which the one or more objects are placed. The method may also include a step of capturing an image of the one or more objects from a fixed position with an imaging device that has a field of view encompassing the scale. There may be a step of receiving depth data for a plurality of locations along the one or more objects. The plurality of locations may be matched to the captured image. The method may include transmitting the image of the one or more objects and the depth data to the data processing device. Furthermore, there may be a step of generating, on the data processing device, dimensional parameters of the one or more objects along a plurality of axes from the image of the one or more objects and the received depth data. The method may also include generating, on the data processing device, a set of packaging parameters based on the generated dimensional parameters and the weight data.

The various aspects of the invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
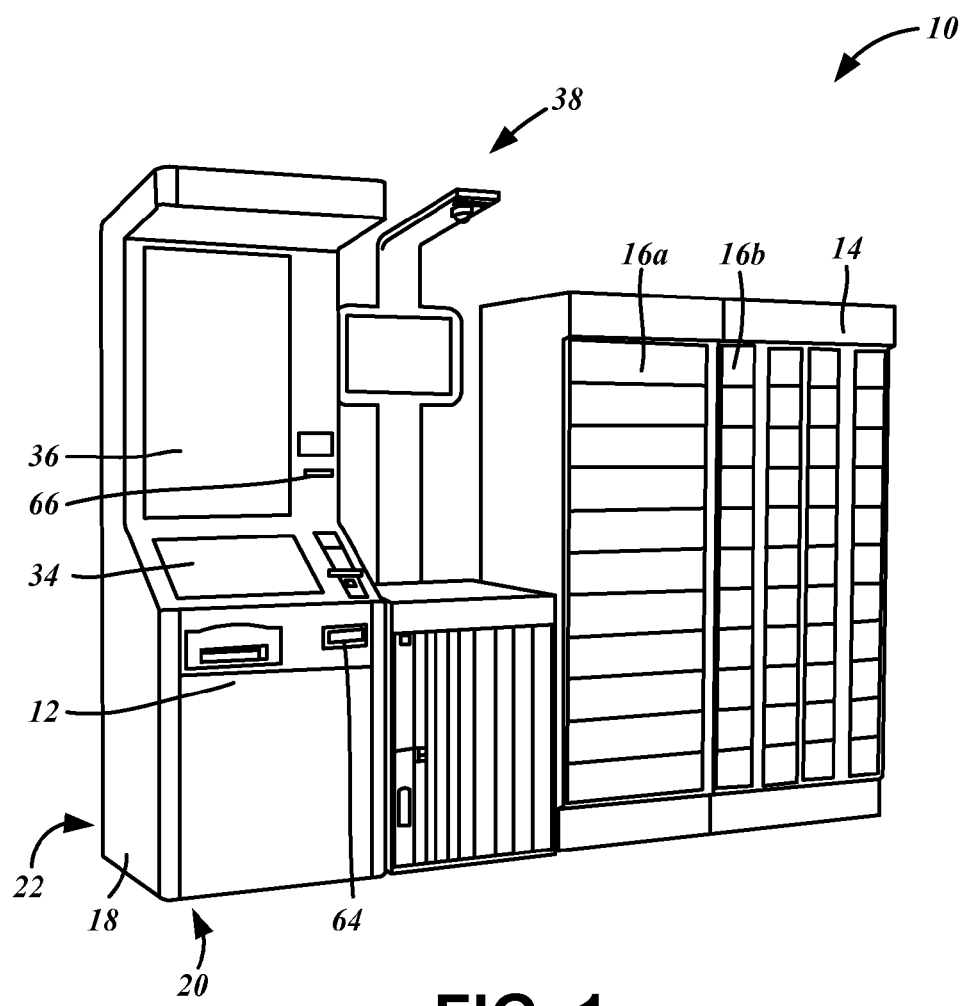
FIG. 1 is a perspective view of an exemplary multifunctional self-service shipping and mail processing kiosk in accordance with one embodiment of the present disclosure.

With reference to FIG. 1, one embodiment of the present disclosure contemplates a multifunctional self-service shipping and mail processing system 10, also referred to herein as a kiosk. A customer is envisioned to utilize the kiosk 10 to conveniently weigh, label, pay for, and ship a package. In order to maximize exposure to potential customers who could benefit from its convenience, the kiosk 10 may be deployed to various retail outlets such as convenience stores, gas stations, and other locations that are open 24 hours a day. The kiosk 10 is not limited to use with any particular package shipping service, and multiple ones may utilize it to deliver and pick up shipments.

In the illustrated embodiment, the kiosk 10 includes a deposit box 12 that accepts packages, which upon the customer's deposit, may alert the selected carrier for immediate pickup. The depicted deposit box 12 may be limited to envelopes and other packages of limited size, so the kiosk may also include an auxiliary locker unit 14 that serves as a repository for both outgoing packages and delivered packages. The auxiliary locker unit 14 is understood to include a plurality of storage compartments 16 of varying sizes. FIG. 1 illustrates a series of large size compartments 16a and a series of small size compartments 16b. The compartments 16 are understood to be modular, in that its sizing and configuration are flexible and can be expanded by combining multiple compartments 16 depending on needs. For those packages that do not fit within the limited confines of the deposit box 12, the storage compartments 16 of the auxiliary locker unit 14 may be utilized. In the same manner that the storage compartments 16 with delivered packages will be access-limited to the designated recipient, to the extent the storage compartment 16 is utilized in connection with outgoing packages, those will be access-limited to designated carrier personnel. A variety of access control modalities such as remotely actuated electro-mechanical locks may be utilized, and those having ordinary skill in the art will be able to readily ascertain various alternatives.

In further detail, the kiosk 10 is generally defined by a housing 18 with a front face 20 and an opposing rear face 22. With additional reference to the block diagram of FIG. 2, according to various embodiments, one component of the kiosk 10 is a computer terminal 24 that includes a general-purpose data processor 26 that executes various preprogrammed instructions that are stored in a non-transitory program storage medium such as a memory 28. These instructions are understood to implement various contemplated methods of the present disclosure.

The computer terminal 24 also includes an input device 30 that accepts user input, as well as an output device 32 that displays the results of executing the software instructions. Accordingly, the input device 30 and the output device 32 are both connected to the data processor 26. In one contemplated embodiment, the input device 30 and the output device are combined as in a touch display 34, where the input device 30 is overlaid on the display. Graphical elements may be shown at specific locations within the display, with haptic input at those specific locations corresponding to an activation of those graphic elements. The graphic elements may correspond to various functions that are contemplated for the kiosk. Such functions may involve multiple, high-level operations (such as the package dimensioning procedure, discussed in further detail below) or may be a simple input of a single alphanumeric keys (such as for entering addressee data, etc.).

One embodiment of the present disclosure contemplates the adaptation of a commercially available computing platform as the computer terminal 24. Such computing platforms are differentiated largely on the operating system, and lightweight, portable computing oriented operating systems such as Android from Google, or iOS from Apple may be utilized, as well as more general purpose operating systems such as Windows from Microsoft, or any suitable distribution of Linux and other related operating systems may also be utilized. Generally, it is understood that the operating system includes various frameworks and application programming interfaces that implement graphical user interface components and interactivity, hardware input/output, and so forth, which may be utilized by application software. Nevertheless, a dedicated embedded system that does not rely upon existing computing platforms may also be utilized. Those having ordinary skill in the art will recognize that the computer terminal 24 may be variously implemented, with no particular implementation being more suitable for the kiosk 10 than others.

The computer terminal 24 is understood to be disposed within the housing 18, and as shown in FIG. 1, the touch display 34 is accessible from the front face 20 thereof. Aside from the touch display 34, there may be a secondary display 36 also built into the housing 18 for showing informational content such as weather forecasts, news reports, as well as advertisements. The secondary display 36 may accept haptic input, allowing the viewer to interact with the advertising content. Being that a typical deployment is a retail establishment, product placement type advertisements are contemplated. Any revenue from the advertiser may be shared with the retailer, along with the provider of the kiosk 10.

Such a display is understood to require minimal data processing overhead, so the functionality may be handled by the computer terminal 24. Additionally, existing data communications modalities of the computer terminal 24 may be utilized to retrieve updated content. Such informational displays are known in the art, and a variety of implementations exist, along with specific service providers that provide updated content, maintenance, and so forth. Thus, it may be possible for the secondary display 36 to utilize a separate computer system that is controlled by such service providers, rather than being combined with the operation and maintenance of the presently disclosed shipping and mail processing system.

As will be described in further detail below, the user interacts with the touch display 34 and the computer terminal 24 to invoke various package shipping processes. Again, the kiosk 10 may be located inside a retail establishment, with the typical positioning being against an interior wall. Thus, in many cases, the rear face 22 of the housing 18 may be obscured. In some cases, however, it may be possible to position the kiosk 10 against a window, such that the rear face 22 is visible from the outside. For such deployments, there may be an additional display device on the rear face 22 of the housing 18, where advertising content may also be presented. The control and retrieval of data for this display may be coordinated with those of the secondary display 36, though this is by way of example only and not of limitation. Along these lines, any advertisement revenue from such displays may also be shared as described above.

Figure 2:
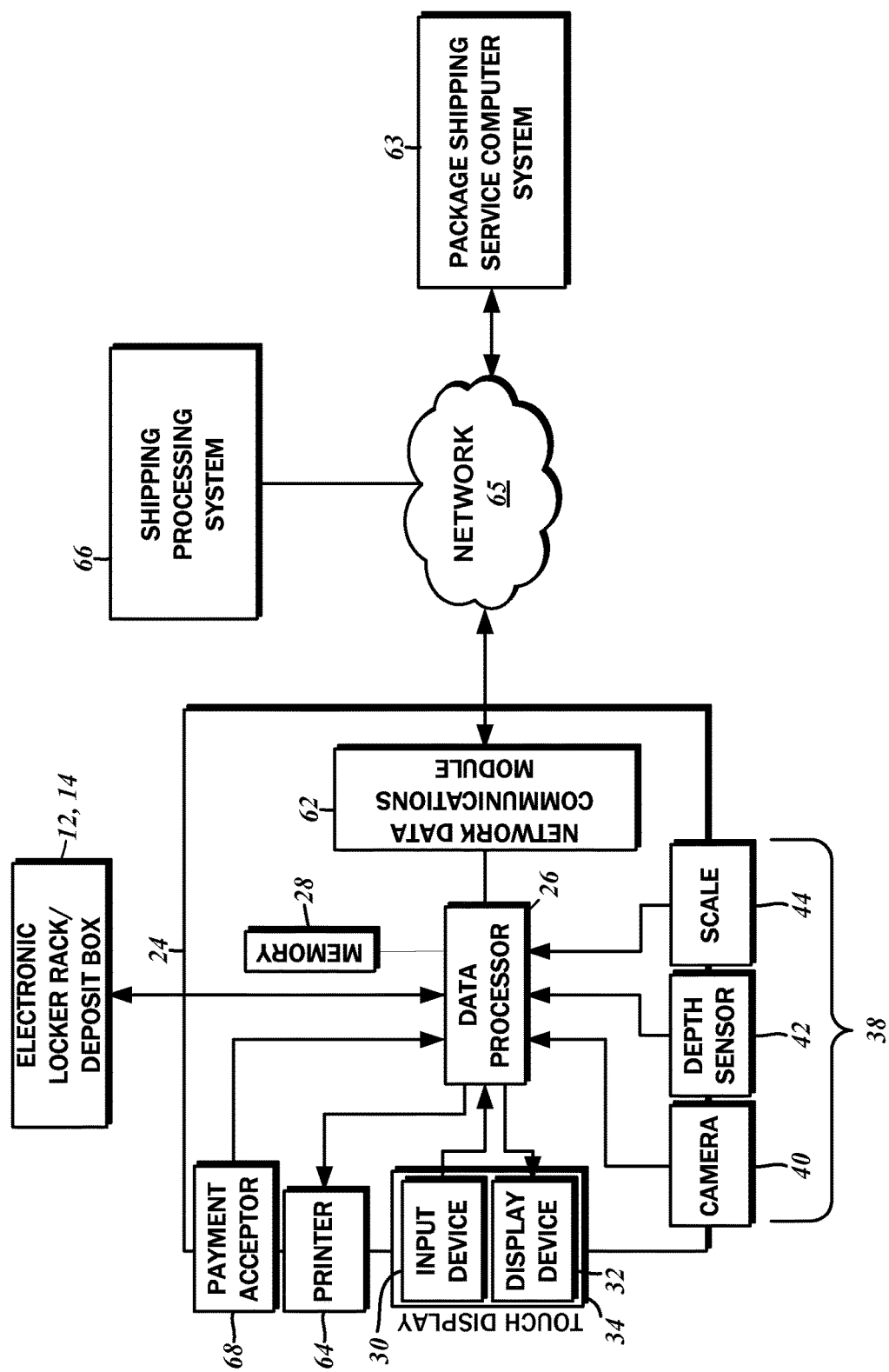
FIG. 2 is a block diagram of the self-service shipping and mail processing kiosk in an exemplary environment.

Easing the burdens associated with preparing a package for shipment is one of the contemplated objectives of the various embodiments of the present disclosure. In this regard, the kiosk 10 may incorporate a modality by which an object for shipping is matched with the smallest size box or enclosure while also providing appropriate cushioning enough to sustain typical shocks encountered during shipping that is particular to the object in the package. As shown in FIGS. 1 and 2, the kiosk 10 further includes a package dimensioning station 38. Although the package dimensioning station 38 is shown as a separate standalone unit from the kiosk 10 that is generally defined by the housing 18, it will be appreciated that the features of the package dimensioning station 38 and the other features of the kiosk 10 may be integrated into a single unit with a smaller footprint. The separated configuration of the package dimensioning station 38 is presented by way of example only and not of limitation.

Figure 3:
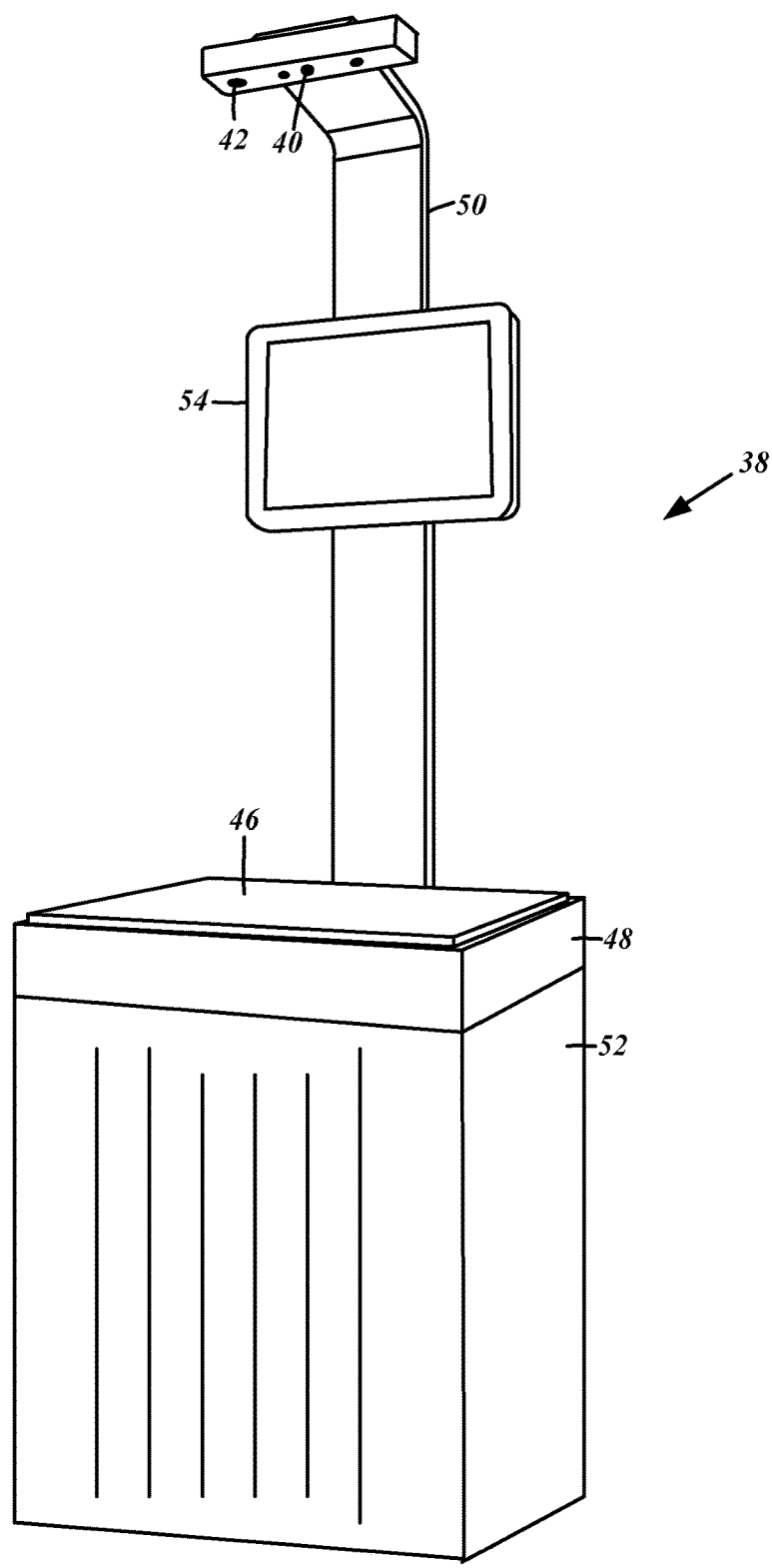
FIG. 3 is perspective view of a package dimensioning station of the kiosk.

The block diagram of FIG. 2 further illustrates the package dimensioning station 38 including a camera 40, a depth sensor 42, and a weighing scale 44 that are utilized for taking measurements of objects to be packaged and shipped. With additional reference to the detailed perspective view of the package dimensioning station 38 shown in FIG. 3, the weighing scale 44 is comprised of a platform 46 that is engaged to a base 48 with a load cell. It is understood that the load cell generates an electrical signal corresponding to the force of the objects placed on the platform 46, and that electrical signal is transmitted to the computer terminal 24 for further processing. The base 48 may be integral with a storage cabinet 52 that may be used for storing boxes, insulation, adhesive tape, labels, writing instruments, and other materials needed for packaging.

The camera 40 and the depth sensor 42 are vertically offset from the platform 46, and are understood to have a field of view substantially corresponding to the surface area of the platform 46, though in order to accommodate packages/objects that have a larger footprint than the platform 46, it may have a wider field of view. Fixed to the base 48 is an extension arm 50, the opposite end of which the camera 40 and the depth sensor 42 are disposed. The camera 40 is understood to capture color images of its field of view, and includes a sensor with individual sensor elements that detects red, green, and blue color components. The depth sensor 42 measures the distance between various points in space that are correlated to specific parts of the captured image, and a multidimensional representation of the object can be generated. A variety of depth sensors are known in the art, and typically based on structured light or time of flight. Some examples of commercially available depth sensors include Xtion 3D sensors from Asus, Realsense sensors from Intel, and Camboard sensors from PMD Tec.

In the depicted embodiment, there is a dimensioning station display 54 that shows more detailed information pertaining to the procedure of measuring the object(s) to be packaged and shipped. The dimensioning station display 54 is understood to be part of the computer terminal 24 in some embodiments, though it is also possible for it to be a standalone computing device that handles all of the dimensioning operations including sensor data capture and processing, and merely reports the results to the computer terminal 24 of the kiosk 10. In this regard, the dimensioning station display 54 may also be referred to as a terminal as well, and can be a Linux or Android based computer.

Figure 5:
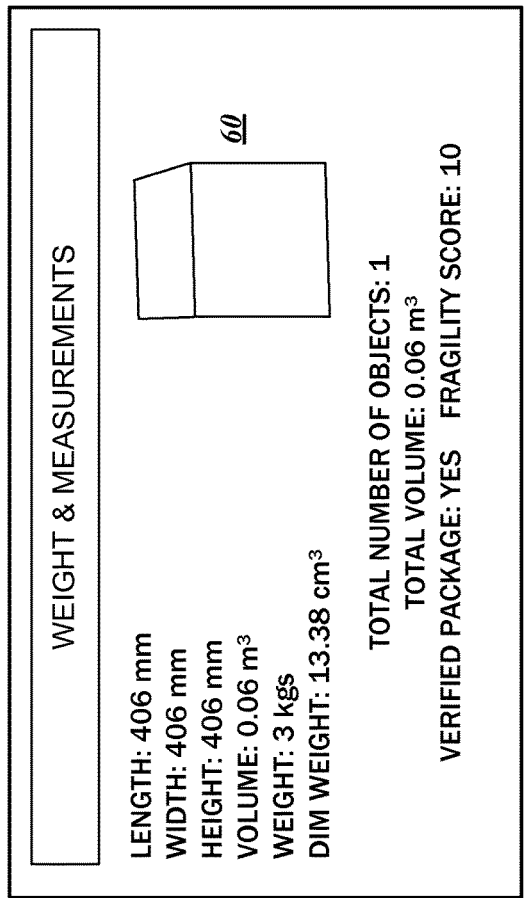
FIG. 5 is an exemplary screen display following the automated measuring of the package.
Figure 4:
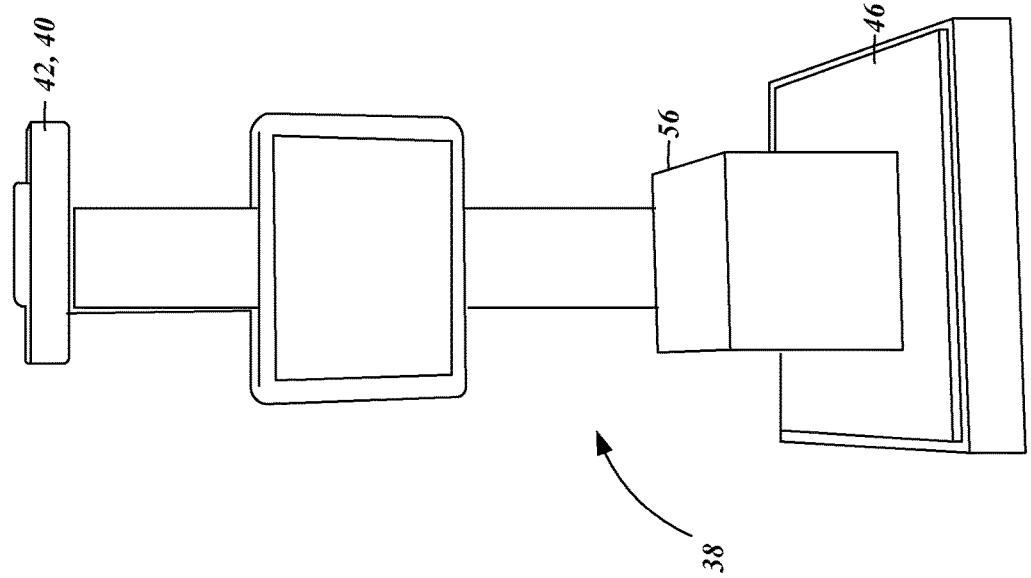
FIG. 4 depicts a package being placed on the package dimensioning station.

Referring now to FIG. 4, by way of example, a box 56 is shown placed on the platform 46, and within view of the camera 40 and the depth sensor 42. The cuboidal dimensions of the box 56 along with its weight are measured. According to one implementation, the camera and depth sensor are accurate to 1 mm, while the weight is accurate to 1/100 of a gram. These measurements are possible regardless of the orientation or alignment of the box 56 relative to the platform 46. Thus, the tedious manual measurements and weighing of packages prior to shipping can be minimized or eliminated. FIG. 5 is an exemplary screen 58 shown on the dimensioning station display 54. The captured image 60 of the box 56 is shown, along with the measured length, width, height, and weight. From the measurements the volume of the package is calculated, as well as the dimensional weight.

It is possible for the camera 40 to capture images of shipping labels and other indicia that may be affixed to the object. Such shipping labels may incorporate bar codes that may reference records that contain shipper and recipient information. Alternatively, with the use of optical character recognition, written shipper and recipient address information may be captured. After receiving address information, a record may also be generated for tracking purposes, and may be transferred to other computer systems, such as a computer system 63 of the package shipping service that is tasked with delivering the package to the recipient. Because the kiosk 10, and specifically the computer terminal 24 may be separate from the package shipping service computer system 63, interconnection for data transfer purposes may take place over a network 65 such as the Internet. Referring to the block diagram of FIG. 2, the computer terminal 24 includes a network data communications module 62 that implements various data transfer modalities such as WiFi, Universal Serial Bus, Ethernet, and so forth for communicating captured data. It will be appreciated that any suitable data transfer modality may be utilized.

In view of the computer terminal 24 being a general-purpose computer system, together with the connection to the Internet, another application that may be loaded is a web browser. Accordingly, the kiosk 10 may be utilized as a self-service Internet access point as well, allowing customers to send e-mails, documents, and the like, serving as a limited access business center.

It is expressly contemplated that objects extending beyond the platform 46 may be captured and dimensioned, and multiple objects within the field of view of the camera 40 may be detected. To the extent there are other objects within the field of view, but not positioned on the platform 46, those objects may be ignored for purposes of dimensioning. Although any suitable image processing methodology may be utilized, a connected element analysis for continuous features of those objects positioned on the platform 46 may be performed. This way, dimensions of large packages can be accurately measured, while also eliminating packages nearby (and within view of the camera 40) but not placed on the platform 46. Other obstructions within the field of view of the camera 40 may also be eliminated.

The capturing of multiple objects placed on the platform 46 is not limited to completed packages that are awaiting shipment, but also to items that have not yet been packaged. Once these multiple objects are weighed and dimensioned, a recommendation as to suitable package size and insulation may be generated. This is contemplated to eliminate the guesswork and trial-and-effort approach to preparing a package for shipment. Additionally, the order in which items are placed in the container may also be indicated. In one embodiment, an accurate three-dimensional representation of each of the objects may be generated. A visual record of the state/condition of each of the objects prior to packing can be generated, minimizing carrier insurance claims.

Based on the calculated interior dimension and volume of the object, the required density of insulation for packaging can be determined. The insulation density is based upon typical shocks encountered during shipment that are the primary cause of content breakage, relative to a fragility index of each of the objects within the single package. The fragility index, in turn, is based upon the composition of the object. A breakage point of the object is also determined from the fragility index, e.g., given a specific fragility, the maximum shock it can be subject to without breakage. It is possible for the user of the dimensioning system display 54/computer terminal to specify, for each identified object, a broad category as to its composition (e.g., glass, ceramic, metal, paper, and so forth). The density of the insulation needed to isolate each of the identified objects from shock to an extent not exceeding the breakage point, with sufficient tolerances, can then be calculated. Accordingly, a measurable process that statistically quantifies best packing practices is contemplated.

By way of example, the user may specify the type of object being packaged, along with its composition, such as "porcelain vase." The weight and the dimensions are measured by the package dimensioning station 38. Known statistics regarding porcelain is compared to fragility indices, and the insulation density required to absorb typical shockwaves sufficient to maintain the structural integrity of a porcelain vase of the measured size and density is calculated. The specific data of the fragility index may be retrieved from a remote service, or may be stored in the memory 28 of the computer terminal 24.

Figure 6:
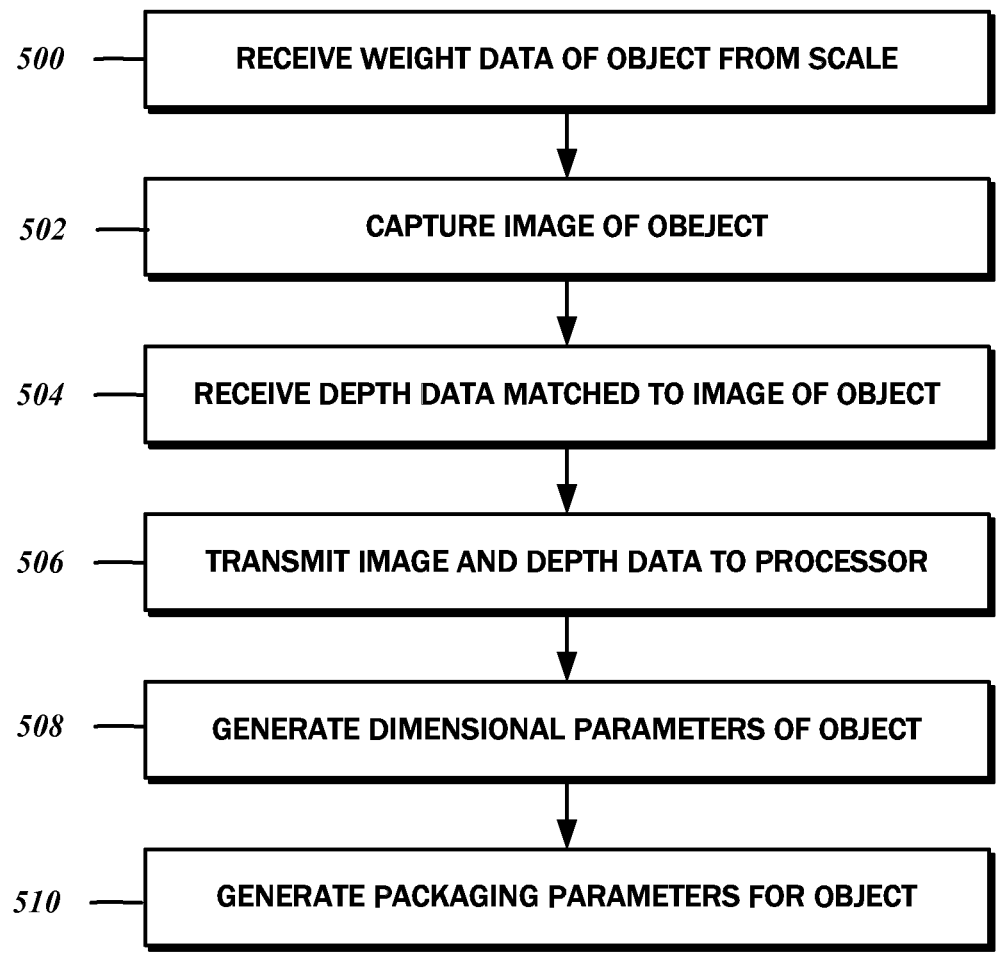
FIG. 6 is a flowchart depicting one embodiment of a method for preparing an object for shipping.
Figure 7A:
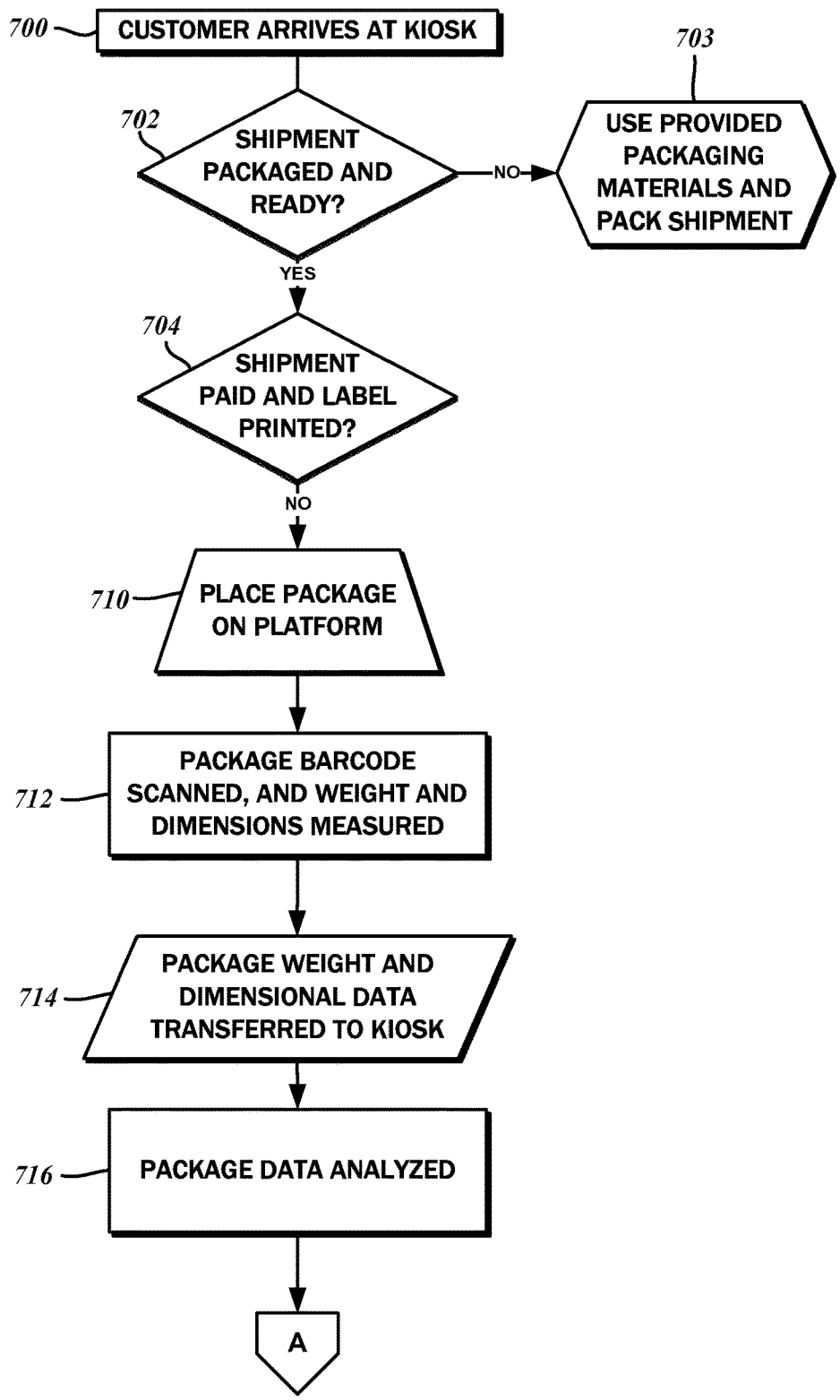
FIGS. 7A-7D are flowcharts depicting an exemplary sequence of user interaction to initiate a package shipment with the multifunctional self-service shipping and mail processing kiosk of the present disclosure.
Figure 7B:
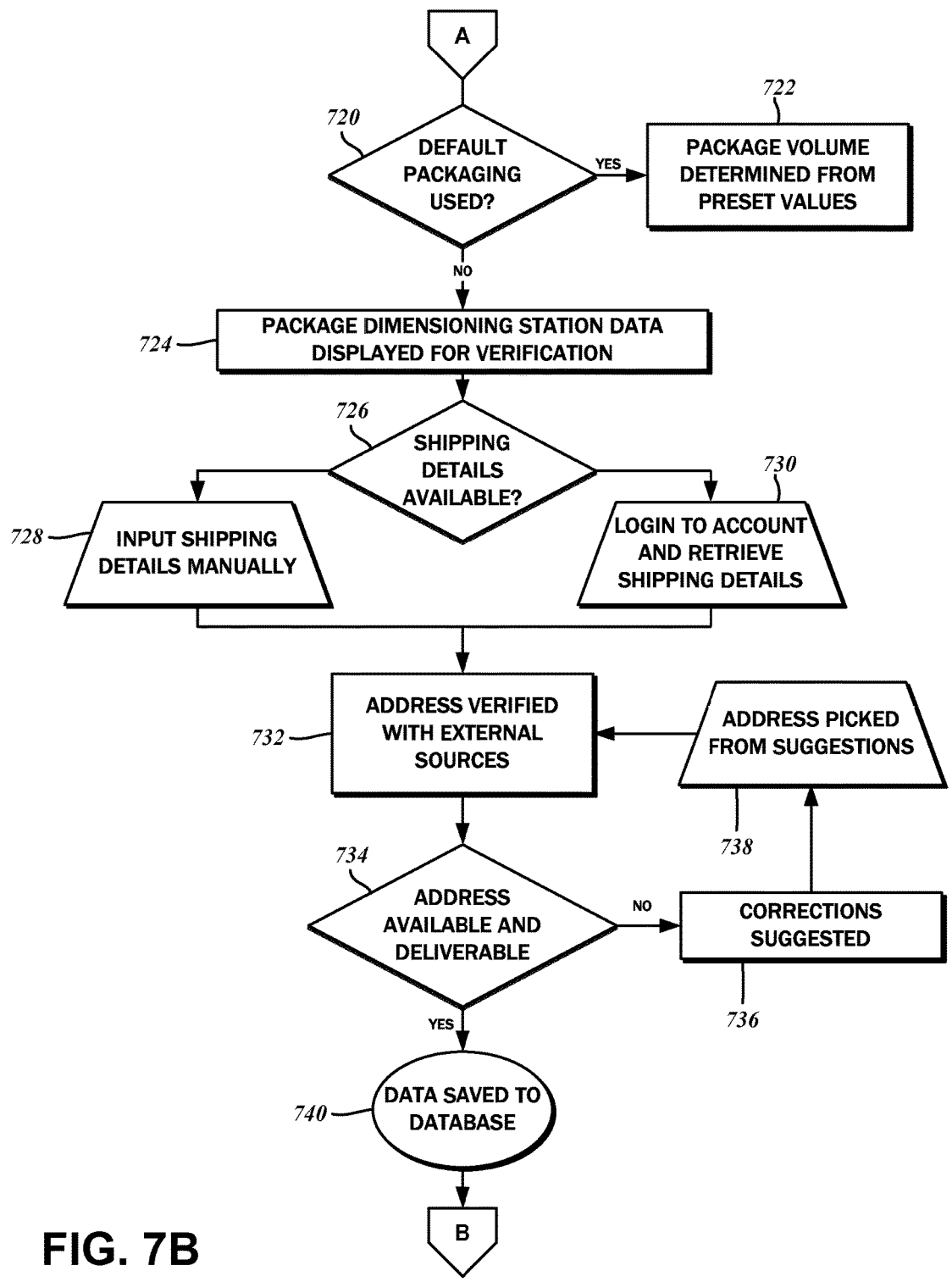
Figure 7C:
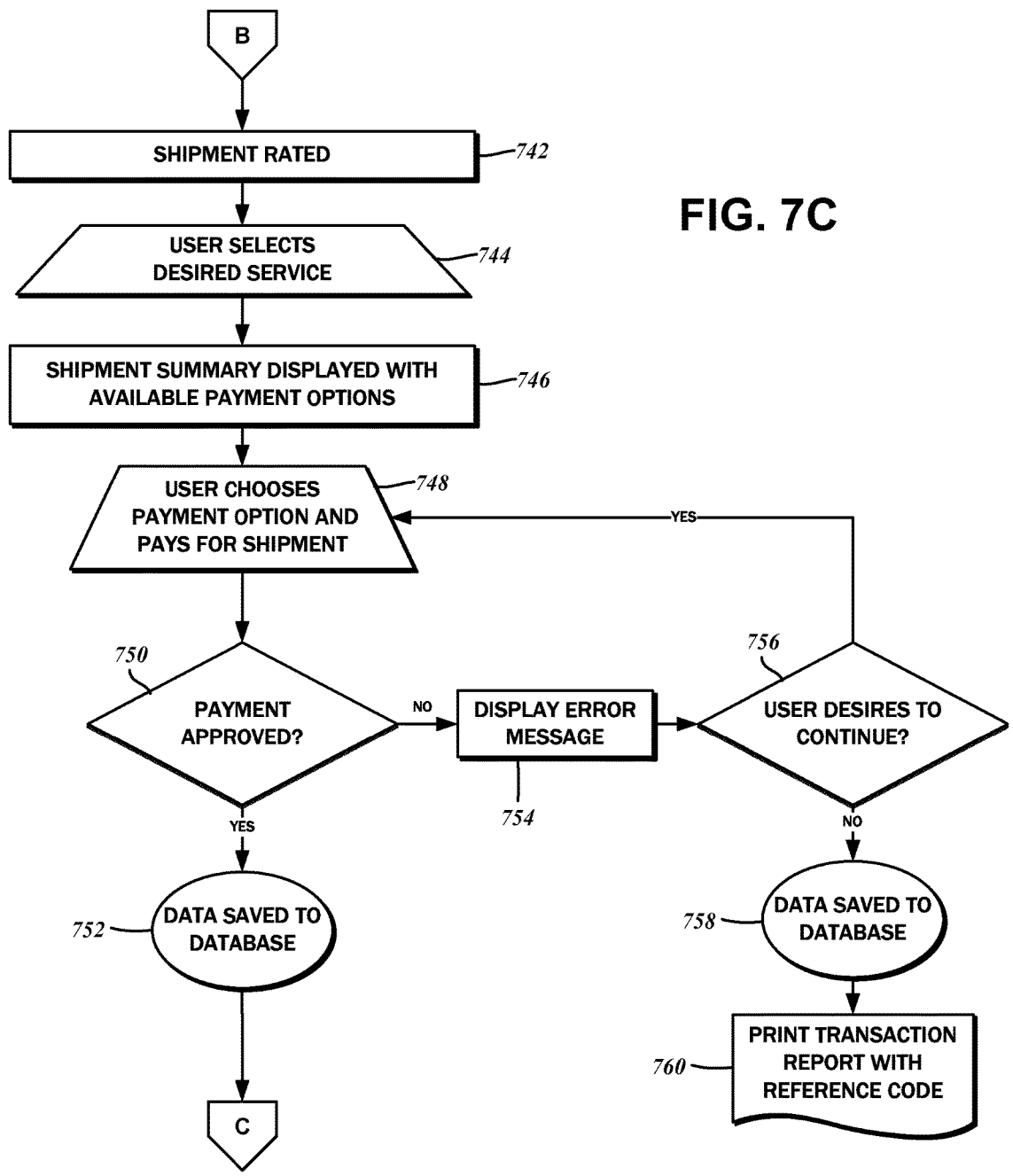
Figure 7D:
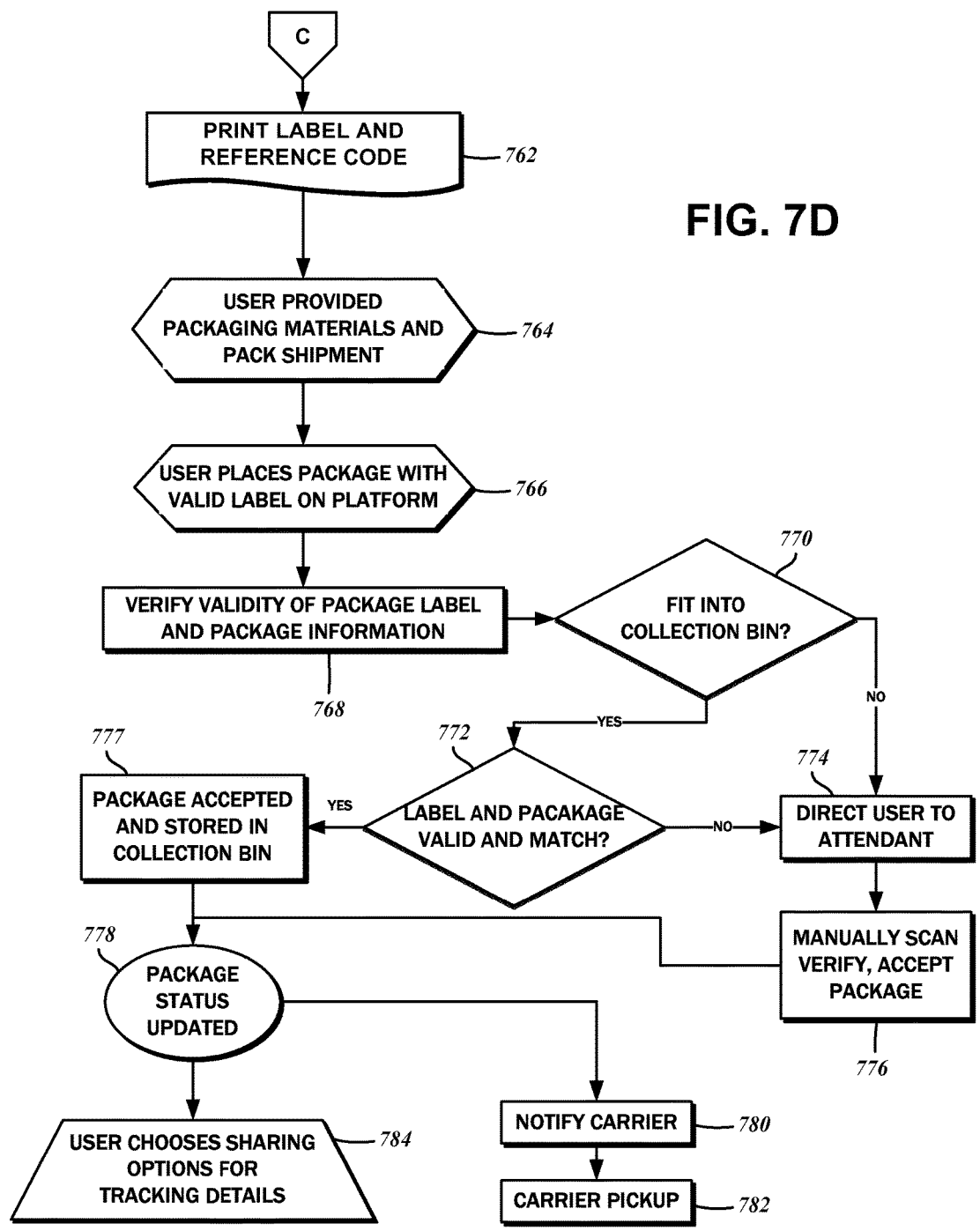

More generally, with reference to the flowchart of FIG. 6, a method for finalizing a package is contemplated as one aspect of the present disclosure. The method begins with a step 600 of receiving the weight data of the object from the weighing scale 44. Although the object is referred to in the singular form, as indicated above, the contemplated procedure is also possible with multiple objects. It is understood that the weight data is received on the processor 26, so that further calculations and comparisons can be made. Additionally, in a step 602, the image of the object is captured by the camera 40, and in a step 604, depth data that is matched to the image of the object is received, again, on the processor 26. The image and the depth data are then transmitted to the processor 26 according to a step 606. Dimensional parameters of the object, which are understood be along a plurality of axes, are generated from the image of the object and the depth data in a step 608, followed by a step 610 of generating the packaging parameters for the object. The packaging parameters may be based on the generated dimensional parameters and the weight data.

After the items are packaged, appropriate shipping labels may be generated. Referring again to FIG. 1, the kiosk 10 includes a label printer 64 that outputs shipping labels with sender and recipient address information. As indicated above, the camera 40 may capture address information written on the package at the time of measuring dimensions and weight, but it is also possible for the user to input this information via the computer terminal 24. The user may establish an account with a remote shipping processing system 66 that records each shipment that the user originates or receives, and the computer terminal 24 may retrieve addressee information on the fly to populate the new shipment record that is being originated. The user interface of the computer terminal 24 may include various usability enhancements with the additionally available data, including instant and predictive address field populating.

The remote shipping processing system 66 is connected to the computer terminal 24 over the network 65, and other devices, such as a user mobile communications device, may also have access to the data and services thereof so long as a connection to the network 65 can be established. Thus, shipment records can be accessed remotely by the customer to process and track packages. Along these lines, many data input functions can also be handled beyond the computer terminal 24 of the kiosk 10, so once the shipment has been started, any step may be resumed on a different access modality. For example, the sender can enter recipient address information from a mobile device prior to reaching the kiosk 10, and then continuing with the packing and labeling functions on the kiosk 10. There are various techniques for handing off functions from one to another, including connected logins, or secure QR codes. Any suitable method can be utilized in accordance with the present disclosure.

Another function of the kiosk 10 is accepting payment of the shipping tariff, which is understood to be based upon the dimensions and/or weight of the package. With the aforementioned automated procedure of acquiring such information about the package, the pricing procedure can also be part of the automation. In this regard, the kiosk 10 includes a payment acceptor 68, which may be a credit card reader, a cash processor and so forth. Beyond accepting payment for the shipping tariffs, the kiosk 10 may accept and remit payment for other services including those offered by third parties such as utility companies, auto finance companies, and the like. Aside from conventional payments as credit cards and cash, the card reader may also be configured to process gift cards, loyalty cards, and so on. Replenishment of debit cards may also be possible with connectivity to banking/automatic teller machine networks.

To the extent users of the kiosk 10 experience any difficulty accessing or otherwise interacting with its features, remote assistance may be provided by customer service agents 70 that are connected to the computer terminal 24 via the network 65. The user may interact with the customer service agent 70 via a video chat, though voice-only communications modalities, and text-based communications modalities are also possible.

Referring now to the flowchart of FIG. 7A-7D, an exemplary sequence of user interactions with the kiosk, particularly with respect to the user initiating a shipment, will be described. The process begins with a step 700, with the customer/user arriving at the kiosk 10. If the shipment is not packaged and ready according to decision step 702, the user completes the shipment with provided packing materials in a step 703. Otherwise, the procedure progresses to another decision step 704, where it is determined whether the shipping costs have been paid and whether a shipping label has been printed. If there has been no payment, and no shipping label has been printed, the process continues with a step 710 of placing the package on the platform 46 of the weighing scale 44. Thereafter, the package barcode is scanned, the weight of the package is measured, and the dimensions of the package are measured according to a step 712 in the manner described above. This data is then transmitted to the kiosk 10, in embodiments where the package dimensioning station 38 has a separate computer terminal. The computer terminal 24 of the kiosk 10 then analyzes the received data in a step 716.

The customer has the option to utilize default packaging materials, or alternatively, his own packaging materials. In a decision step 720, it is determined whether the default packaging is used, and if so, according step 722, the volume is determined from preset values. Otherwise, in a step 724, the measured package weight and dimension data is displayed on the computer terminal for further verification. One possible implementation of this confirmation/display process was described above with reference to the example of FIG. 5.

Next, in a decision step 726, it is determined whether shipping details are available, whether it is from an account stored in a remote server, a mobile device, or a printed barcode on the package. If none are available, then the shipping details (e.g., name, street address, zip code, state, country, etc.) are inputted manually in a step 728. It may be necessary to log into the account, in which case there is a step 730 of providing login credentials (username or e-mail address and password) and retrieving the shipping details.

Regardless of how the address information was retrieved, it may be verified with external sources in a step 732. This may be achieved by querying the shipping processing system 66. In a decision step 734, it is determined whether the specified address exists (whether it is available and deliverable). If not, corrections are suggested in a step 736 that are the closest to the inputted/selected address. According to one embodiment, several suggestions may be generated, in which case the user selects the desired one from the listing of addresses in a step 738. If the address is available and deliverable, according to step 740, the data is then saved in a shipment record stored remotely on the shipping processing system 66, or any other suitable location.

Next, in a step 742, the shipment is rated, that is, different delivery services that are priced according to speed and add-on services are selected. The user makes the selection in a step 744, and a summary of the shipment along with available payment options is presented to the user in a step 746. As understood, payment options refer to payment modalities such as cash, check, credit card, debit card, gift card, and so on. In a step 748, the user selects the desired payment option, and initiates the payment process.

In a decision step 750, it is determined whether the payment was successful; if so, the payment is recorded in the shipment record on the shipping processing system 66 or other suitable storage location in a step 752. Otherwise, an error message is displayed in accordance with a step 754, prompting the user whether he/she would like to proceed further. In a decision step 756, if the input from the user is evaluated to correspond to a desire to continue, the process returns to step 748, where an alternative payment modality can be specified (or retried with the same payment modality, if the first try was unsuccessful for a reason not relating to the validity of the payment modality (such as an error reading data from a magnetic strip on the card). On the other hand, if the user does not desire to continue, the entered data pertaining to the shipment is saved to the shipping record in a step 758, and a transaction report is printed with the printer 64 in a step 760. This transaction report is understood to include a reference code that particularly refers to the shipping record, so that it may be subsequently retrieved to continue the process at a later time.

Once the payment has been approved in the aforementioned step 750, the process continues with a step 762, in which the label to be affixed on to the package is printed, including the aforementioned reference code. The user is provided with packaging materials, and packs the shipment in accordance with a step 764. The labeled package is then placed on to the platform 46 of the package dimensioning system 38 per step 766. The validity of the label is confirmed in a step 768, e.g., that an identifier of the shipment printed on the label matches to a shipment record with the same identifier. Then, if it is determined that the package fits into the collection bin per decision step 770, the information on the label is confirmed to substantially match with the actual measured dimensions and weight of the package in a decision step 772. If the package does not fit, or if the label and the package do not match, the user is directed to an attendant for further assistance per step 774.

Once the attendant manually scans, verifies, and accepts the package in a step 776, or if the package is accepted and stored in the collection bin without attendant intervention per step 777, the status of the shipment is updated on the shipping processing system 66 according to a step 778. The carrier is then notified according to a step 780, followed by the carrier picking up the package in a step 782. Additionally, it is also possible for the user to choose sharing options for tracking per step 784, such as e-mailing the same to the recipient of the package, or any other person as desired.

Instead of starting and completing the process entirely on the kiosk 10, it is also possible for the user to begin the shipping process remotely (e.g., away from the kiosk 10), and do all but tendering the package to the carrier. Referring now to the flowchart of FIGS. 8A-8D, this procedure may begin with a step 800 of opening a mobile app that is pre-programmed to execute the following steps in accordance with various embodiments of the present disclosure. If the user has already registered and has an account with the shipping processing system 66 as evaluated in a decision step 802, the user may be logged in per step 804. Otherwise, the user may be directed to open a new account per step 806. The mobile device, and the app, thereafter connects to the remote shipping processing system 66 according to a step 808, and the user account is updated to reflect the login in a step 810. A record corresponding to the new shipment is created in a step 812. In a decision step 814, it is determined whether the package dimension and weight information is available. The user may have the facility to make these measurements, but in most cases such information will not be available; the procedure for such cases is disclosed in further detail in the flowchart of FIG. 8B. Alternatively, the procedure for those cases in which dimension and weight information is available is described in FIGS. 8C and 8D.

Figure 8A:
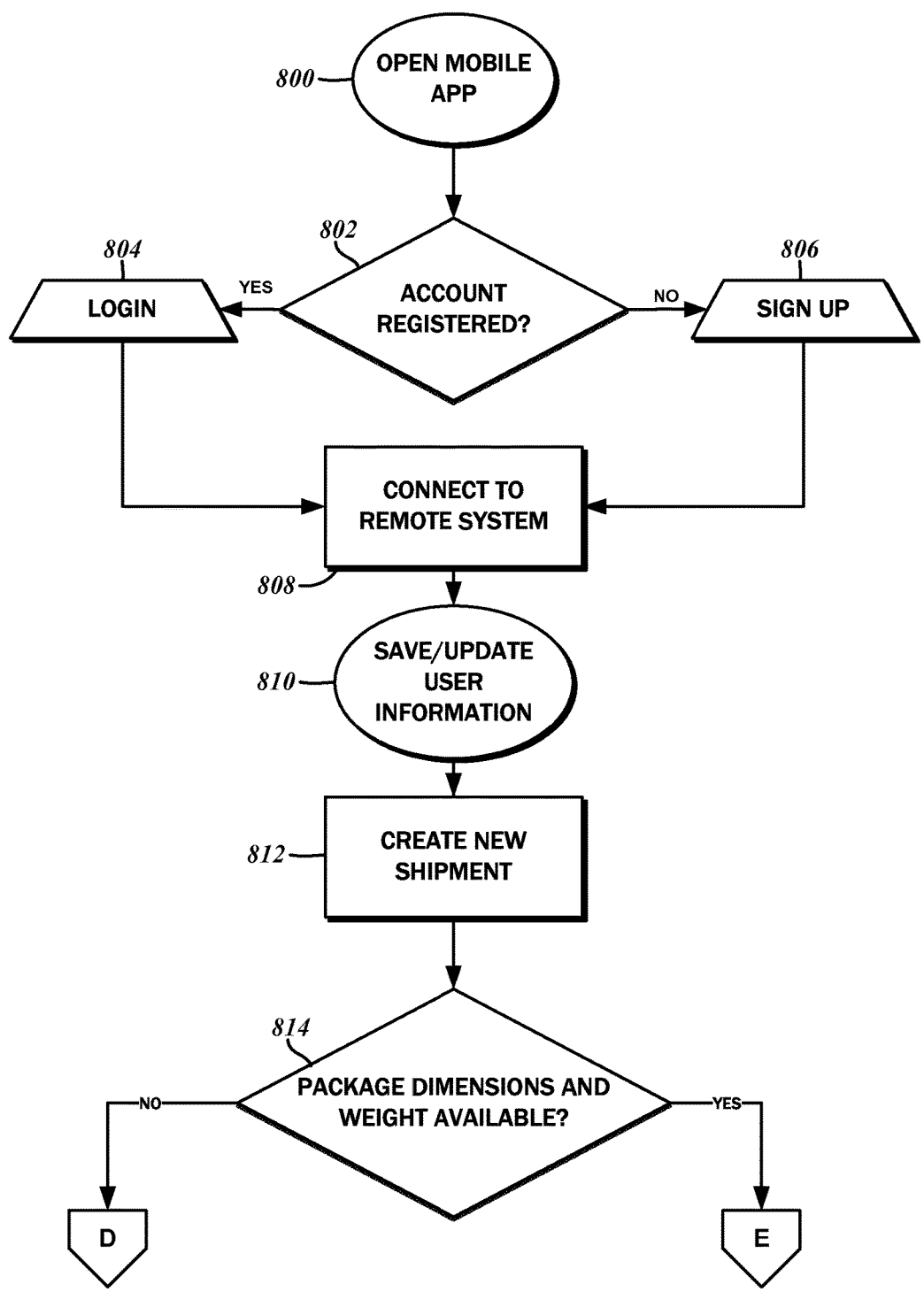
FIGS. 8A-8D are flowcharts depicting another exemplary sequence of user interaction to initiate a package shipment remotely from the multifunctional self-service shipping and mail processing kiosk.
Figure 8B:
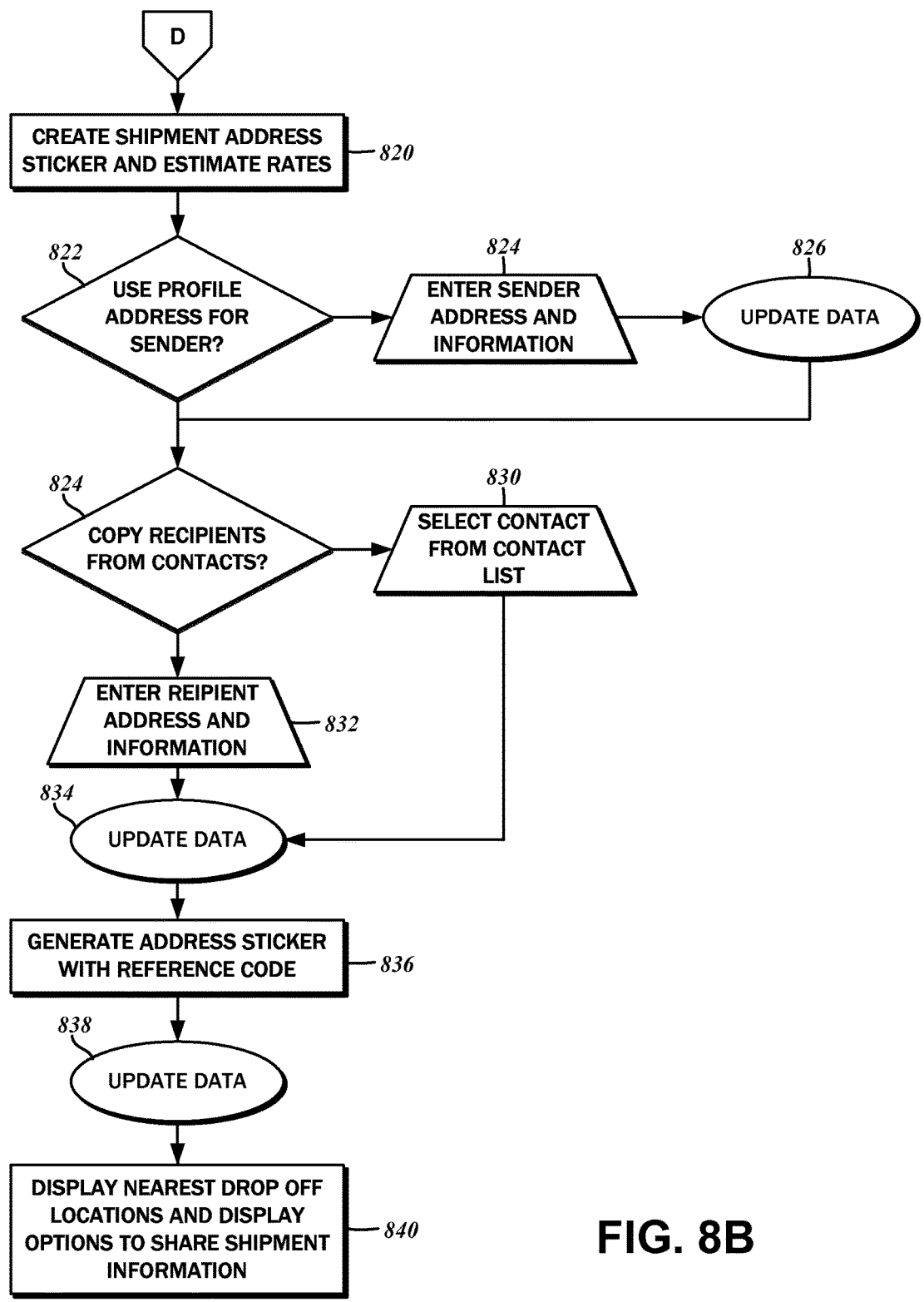

With reference to FIG. 8B, the process for when package dimensions and weight are unavailable begins with a step 820 of defining a shipment address, along with an estimate of rates for such a destination. This information is understood to form part of what is included on the label that is to be printed by the kiosk 10 at drop off. Where the user has an established account with the shipping processing system 66, the sender information (name and address) may already exist. However, if it does exist, there may be some circumstances in which an alternative sender may need to be specified. In a decision step 822, it is determined whether the default sender information associated with the account is to be used, or if an alternative is to be entered. For the latter case, there is a subsequent step 824 of the user entering the sender address and other information, and may be saved to the shipping processing system 66 in accordance with a step 826.

Next, the recipient is specified. It is possible to select an existing, known recipient that has been recorded with the shipping processing system 66, or it may be manually entered. This is understood to be dependent on the evaluation in decision step 828. If an existing contact is desired, it may be selected from a contact list according to a step 830. There is also a manual entry step 832. Whichever selection modality is used, the recipient information is saved to the shipping record in a step 834. A shipping label with the recipient address and the sender address, as well as a reference code specifically referring to the shipment may be generated according to a step 836, and the record thereof is updated in a step 838. In a step 840, the user is then presented with the nearest kiosk location for drop off, as well as sharing options for tracking data.

Figure 8C:
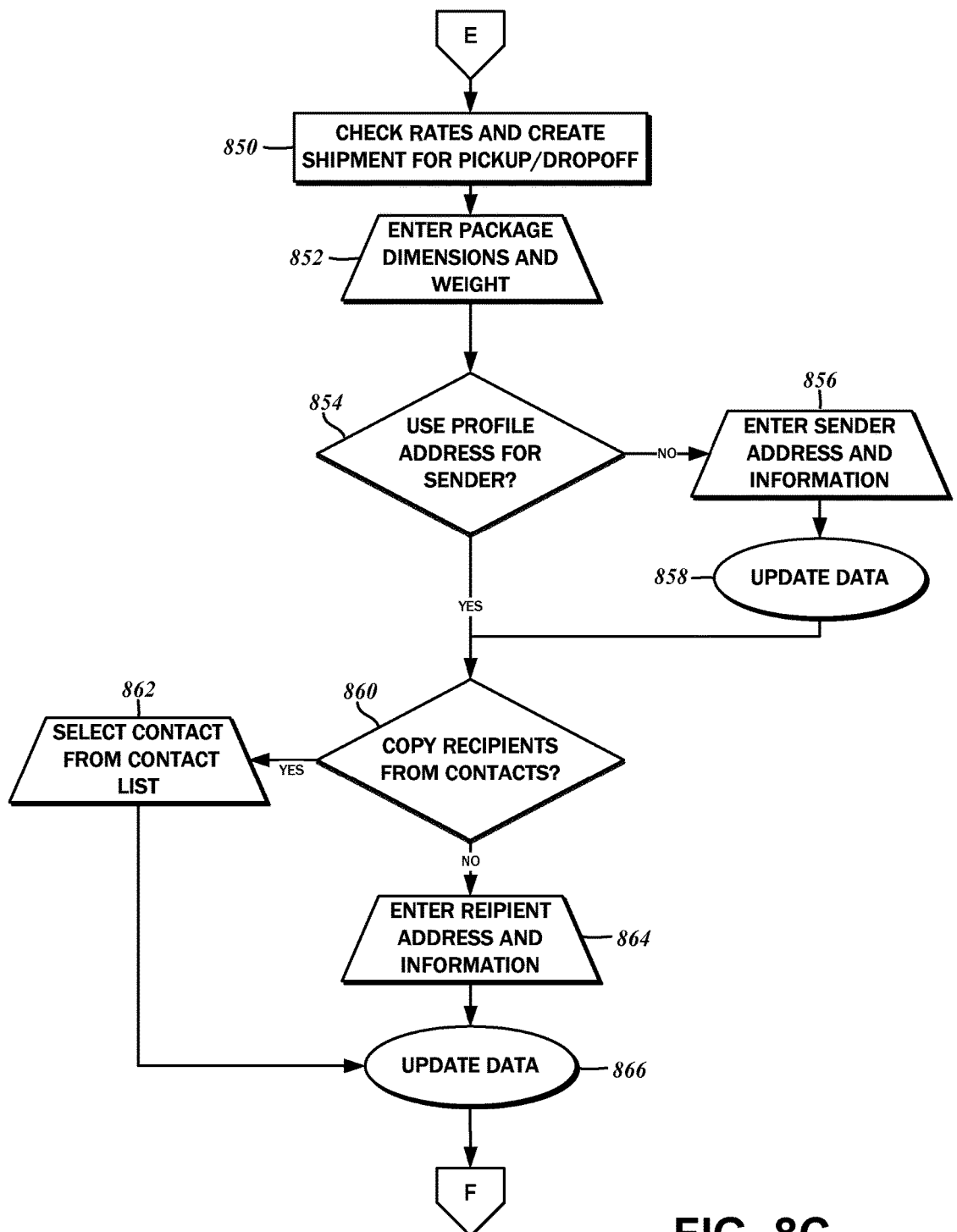
Figure 8D:
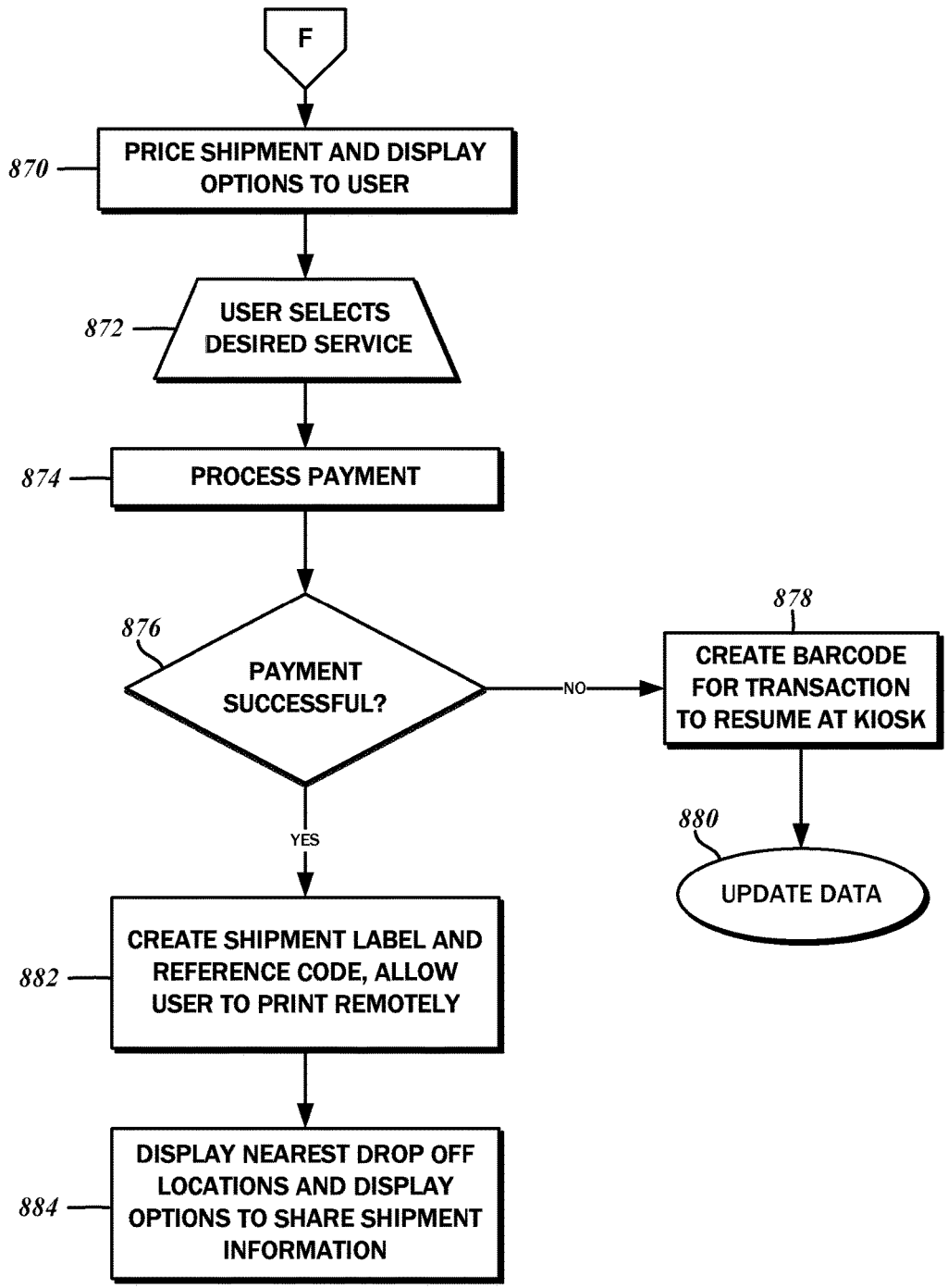
Figure 9A:
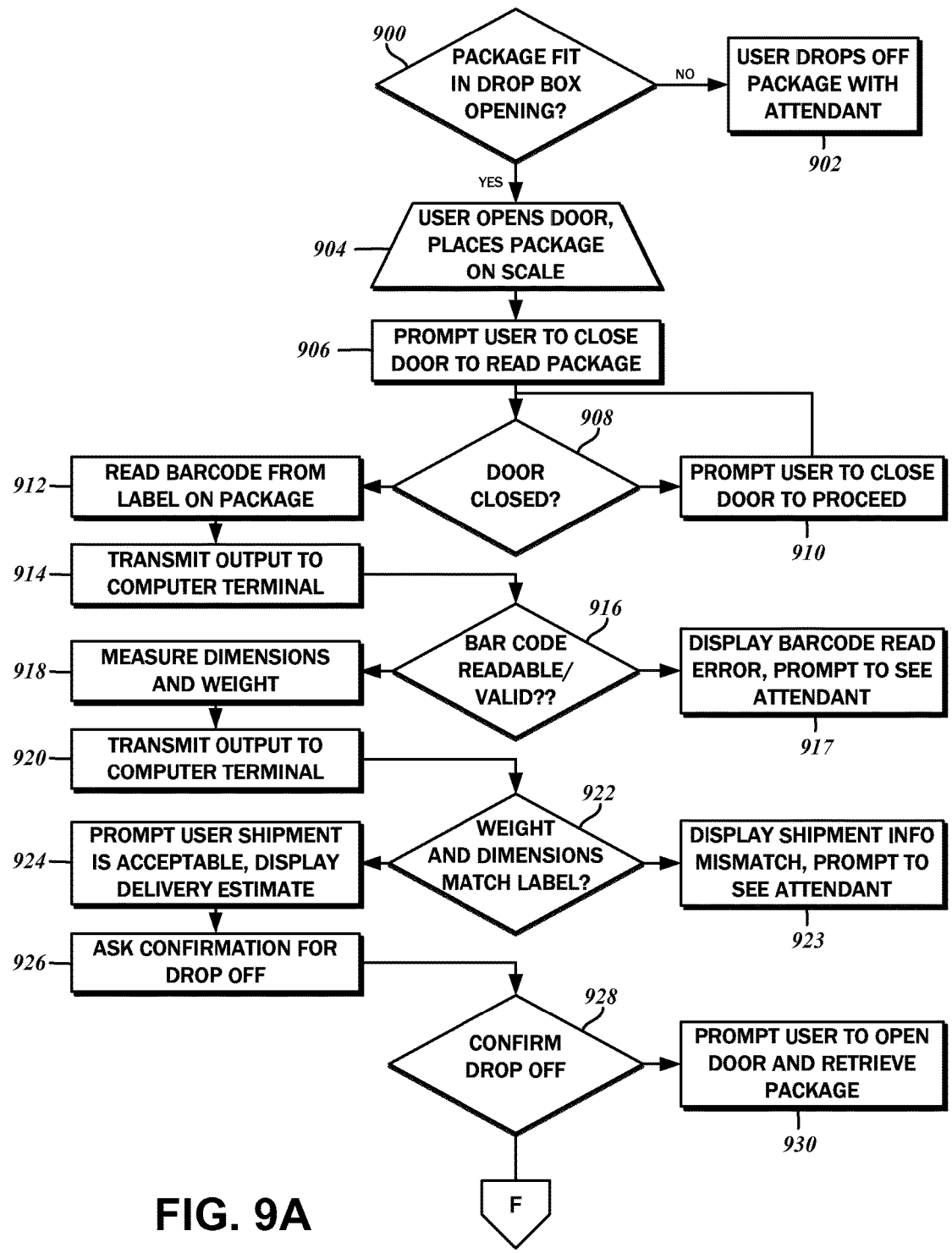
FIGS. 9A-9B are flowcharts depicting an exemplary sequence of user interaction with the multifunctional self-service shipping and mail processing for package depositing after the shipment is created.
Figure 9B:
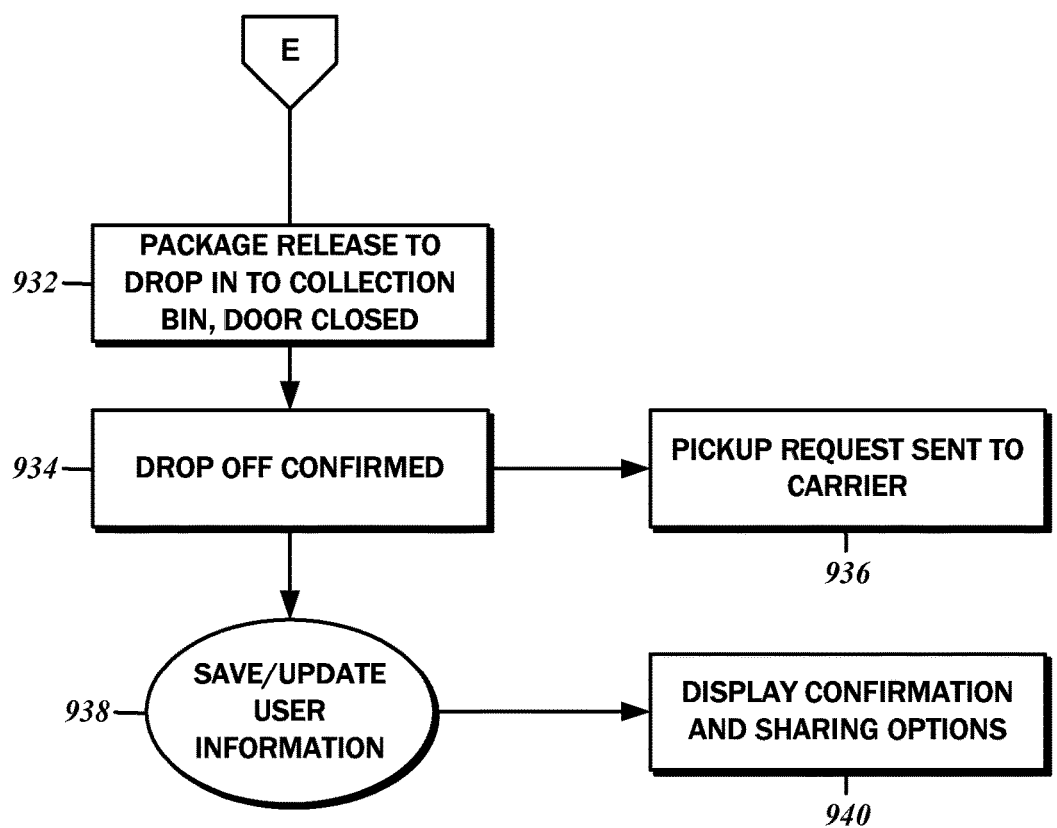

Referring now to FIGS. 8C and 8D, the process for when package dimensions and weight are available begins with a step 850 of checking shipping rates, and creating a new shipment, i.e., a shipping record stored on the shipping processing system 66. The user inputs the package weight and dimensions in a step 852. Again, where the user has an established account with the shipping processing system 66, the sender information (name and address) may already exist. However, even if it does exist, there may be some circumstances in which an alternative sender may need to be specified. In a decision step 854, it is determined whether the default sender information associated with the account is to be used, or if an alternative is to be entered. For the latter case, there is a subsequent step 856 of the user entering the sender address and other information, and may be saved to the shipping processing system 66 in accordance with a step 858.

Similarly, the recipient is specified next. It is possible to select an existing, known recipient that has been recorded with the shipping processing system 66, or it may be manually entered. This is understood to be dependent on the evaluation in decision step 860. If an existing contact is desired, it may be selected from a contact list according to a step 862. There is also a manual entry step 864. Whichever selection modality is used, the recipient information is saved to the shipping record in a step 866.

With the weight and dimensional information entered, it is possible for the user to complete payment remotely. Referring to the flowchart of FIG. 8D, the process continues with a step 870 of pricing the shipment according to data retrieved from the shipping processing system 66. Various options/service levels may be presented to the user, and a selection thereof is received according to a step 872. Payment for the selected service is processed in a step 874 in the manner similar as described above, and in a decision step 876, it is determined whether the payment was successful. If the payment was not successfully made, then in a step 878 a bar code or other identifier that specifies the particular shipment is provided, so that the user can resume the transaction upon arrival at the kiosk 10. That the process has been completed to this step is updated with the shipping processing system 66 in accordance with a step 880.

Where the payment is made successfully, the process continues to a step 882, a shipping label is created that includes the sender and recipient address information, the purchased shipping service, along with the inputted weight and dimensional information. The shipping label, which includes the aforementioned reference code identifying the shipment (and more particularly the shipping record maintained by the shipping processing system 66) can be printed remotely on the user's own equipment. Once printed, the application displays the nearest drop off locations and prompts the user for sharing the tracking information, as desired, in accordance with a step 884.

With the shipment being initiated remotely, the user is directed to the kiosk 10 for tendering.

At the kiosk, if the package does not fit within the deposit box 12 or the auxiliary locker unit 14 as evaluated in a decision step 900, the sender manually tenders the package to the attendant in a step 902. Otherwise, the user places the package on the package dimensioning station 38 in a step 904. To the extent the package dimensioning station 38 includes a door, the user may be prompted to close it in a step 906 in order to proceed with the following steps. The status of the door is evaluated in a decision step 908, and a prompt to close the door as in step 910 loops until the condition is evaluated in the affirmative.

The barcode on the printed label is read from the package in accordance with a step 912, and the information is transmitted to the computer terminal 24. If the barcode is readable and valid as evaluated in a decision step 916, the process continues with dimensioning and weighing the package per step 918. If the barcode is not readable, or invalid, the user is prompted to seek the assistance of the attendant per step 917. At this juncture, an error message indicating that the bar code is unreadable may be displayed on the computer terminal 24.

The measured weight and dimensions of the package are transmitted to the computer terminal 24 according to a step 920, and in an evaluation step 922, it is determined whether the information on the label matches that of the actual package. That is, the weight and the dimensions reported by the package dimensioning station 38 are confirmed to be substantially the same as the corresponding data on the label. If there is a mismatch, the user is prompted to seek the assistance of the attendant per step 923, along with an error message that the weight/dimensions are mismatched to the label. Otherwise, a prompt that the shipment is acceptable is generated, together with a delivery estimate in a step 924. A confirmation is requested that the shipment is acceptable in a step 926, and if confirmed per decision step 928, the package is released to the drop box according to step 932. If there is no confirmation, the user is prompted to retrieve the package per step 930. With the drop off confirmed per step 934, a pickup request may be transmitted to the carrier in a step 936. Additionally, pertinent records for the shipment and the user are updated in a step 938, and further tracking information sharing options are presented to the user in a step 940.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method for finalizing a package including one or more objects prior to its tendering to a package shipping service, the method comprising the steps of:
    providing a package shipping processing system including a kiosk housing, a computer terminal including a display device, an input device, a data processor, and network data communications module, the computer terminal being disposed in the kiosk housing with the display device and the input device being accessible, the package shipping processing system also including a weighing scale including a platform on which one or more objects for shipment are placed, the weighing scale being in communication with the computer terminal with a measured weight of the one or more objects for shipment placed on the platform being reported to the computer terminal, and an imaging device being disposed in proximity to the weighing scale and positioned to have a field of view extending beyond the platform of the weighing scale, the imaging device being in communication with the computer terminal with captured image data of the object placed on the platform being transmitted to the computer terminal, and wherein the data processor stores a fragility index which includes a listing of a plurality of objects and stores a plurality of insulation densities corresponding to the listing of the plurality of objects;
    receiving, on the data processor, weight data from the weighing scale on which the one or more objects for shipment are placed;
    capturing an image of the one or more objects for shipment from a fixed position with the imaging device;
    receiving depth data for a plurality of locations along the one or more objects for shipment, the plurality of locations being matched to the captured image;
    transmitting the image of the one or more objects for shipment and the depth data to the data processor;
    generating, on the data processor, dimensional parameters of the one or more objects for shipment along a plurality of axes from the image of the one or more objects for shipment based on the received depth data; and
    generating, on the data processor, a set of packaging parameters based on the generated dimensional parameters and the weight data;
    inputting, into the input device, a designation of the one or more objects for shipment which is within the data processor's listing of objects;
    selecting, by the data processor, an insulation density based upon the fragility index and the designation of the one or more objects for shipment input into the input device; and
    packaging the one or more objects for shipment within an insulation filled package wherein the package was selected in accordance with the set of packaging parameters and the insulation was selected in accordance with the selected insulation density.

2. The method of claim 1, wherein the packing parameters include at least one or more of the following: package outer dimensions, package inner dimensions, and package insulation density.

3. The method of claim 1, wherein the set of packaging parameters are minimalized to fit the one or more objects for shipment.

4. The method of claim 1, further comprising:
capturing an image of a label affixed to the one or more objects for shipment with the imaging device;
decoding, with the data processor, the label to generate a set of addressing data encoded therein; and
populating fields of a shipment record with the decoded set of addressing data.

5. The method of claim 4, further comprising:
transmitting the shipment record to a computer system of the package shipping service.

6. The method of claim 1, further comprising:
receiving addressing data on the data processor from a user;
storing the addressing data in a shipment record; and
transmitting the shipment record to a computer system of the package shipping service.

\* \* \* \* \*